United States Patent Office 3,526,621
Patented Sept. 1, 1970

3,526,621
SUBSTITUTED 3,1-BENZOXAZIN-2-ONE
Luigi Bernardi, Severina Coda, Lorenzo Pegrassi, and Giselbert Karl Suchowsky, Milan, Italy, assignors to Società Farmaceutical Italia, Milan, Italy, a corporation of Italy
No Drawing. Filed July 25, 1967, Ser. No. 655,749
Claims priority, application Italy, Aug. 3, 1966, 18,005/66; Apr. 20, 1967, 15,166/67
Int. Cl. C07d 87/16
U.S. Cl. 260—244                                          12 Claims

ABSTRACT OF THE DISCLOSURE

Described are substituted 3,1-benzoxazin-2-ones of the formula:

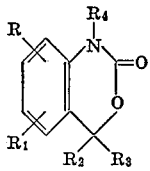

wherein R and $R_1$ may be the same or different and are a hydrogen atom, a halogen atom, a nitro group, an alkyl or alkoxy radical having from 1 to 4 carbon atoms; $R_2$ and $R_3$ may be the same or different and are a hydrogen atom or an alkyl radical having from 1 to 4 carbon atoms, but $R_2$ and $R_3$ are not both hydrogen atoms; and $R_4$ may be hydrogen or an alkyl radical having from 1 to 5 carbon atoms. The new compounds of the invention are usefully employed because of their relaxing activity or striated muscular fiber in conditions of muscular hypertonia and because of a good anticonvulsivant, tranquillizing and anti-Parkinson activity. Also described is a process for preparing the new compounds.

---

The invention provides as new compounds, substituted 3,1-benzoxazin-2-ones of the formula:

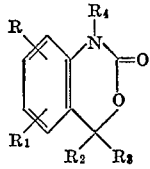

wherein R and $R_1$ may be the same or different and are a hydrogen atom, a halogen atom, a nitro group, an alkyl or alkoxy radical having from 1 to 4 carbon atoms; $R_2$ and $R_3$ may be the same or different and are a hydrogen atom or an alkyl radical having from 1 to 4 carbon atoms, but $R_2$ and $R_3$ are not both hydrogen atoms; and $R_4$ may be hydrogen or an alkyl radical having from 1 to 5 carbon atoms. The symbols R, $R_1$, $R_2$ and $R_3$ and $R_4$ are consistently used herein to indicate substituents in or intended for the positions shown in the above general formula, and have the meanings indicated above.

The new compounds of the invention are usefully employed because of their relaxing activity on striated muscular fiber in conditions of muscular hypertonia and because of a good anticonvulsivant, tranquillizing and anti-Parkinson activity. They are stable to light and to heat. They may be used in pharmaceutical compositions in admixture with a diluent or carrier.

The invention includes a process for the preparation of these new compounds which consists in cyclizing o.aminophenyl-mono- or di-alkylcarbinol of the formula:

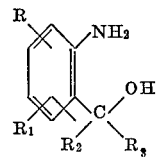

which may be substituted in the benzene ring with phosgene in the presence of a condensing agent and optionally alkylating the 3,1-benzoxazin-2-one so formed with a suitable alkylating agent able to substitute an alkyl radical of from 1 to 5 carbon atoms for the aminic hydrogen.

The carbinol is preferably dissolved in a solvent such as tetrahydrofuran, benzene or diethyl ether and treated with phosgene or a reagent usually employed in organic synthesis, for instance carbonyl-diimidazol and a condensing agent such as pyridine to give the corresponding 3,1-benzoxazin-2-one. Isolation may be, for example, by crystallization.

Optionally, the 3,1-benzoxazin-2-one dissolved in a suitable anhydrous solvent such as, for example acetone, benzene or toluene, is treated at the boiling temperature of the solvent used with a suitable alkylating agent, which may consist of alkyl sulphates and sulphonates and alkyl halides. It is preferred to operate with an excess of an alkylating agent so that a complete alkylation of the nitrogen atom of the starting product be obtained. Then it is filtered, washed with a non-polar, anhydrous solvent such as benzene or ethyl ether followed by evaporation in vacuo of the filtrate to yield the corresponding 3,1-benzoxazin-2-one N-alkylate.

4,4-dimethyl-6-bromo-3,1-benzoxazin-2-one at a dose of 200 mg./kg. per os completely inhibits the tremor caused by the administration of Tremorin and Oxytremorin. In cat it has no effect on the myoneural junction, slight effect on polysynaptic spinal reflexes, and it lowers decerebrate rigidity. The new compounds of the invention when tested on male albino rats (weight 20–25 g.) showed a depression together with a lowering of the muscular tone, hypothermia and palpebral ptosis. The myorelaxing effect had been tested on the above rats to compare the anticonvulsive action against various convulsive agents such as cardiazol, strychnine, nicotine and electric shock using as a standard reference, myanesin (1,2-dihydroxy-3-(2-methylphenoxy)-propane).

Table 1 indicates the active dose of 50% in mg. per kg. body weight per os ($AD_{50}$), which represents the amount of the compound that protects 50% of the treated animals from convulsions and death.

TABLE 1.—ACTIVE DOSES ($AD_{50}$)

| Compound | Cardiazol convulsions | Strychnine Convulsions | Death | Nicotine Convulsions | Death | Electric shock convulsions | $LD_{50}$ mg/kg os. |
|---|---|---|---|---|---|---|---|
| 4,4-dimethyl-3,1-benzoxazin-2-one | 88 | 190 | 150 | 120 | 42 | 130 | 880 |
| 4,4-dimethyl-6-bromo-3,1-benzoxazin-2-one | 70 | 365 | 325 | 44 | 41 | ≅70 | 950 |
| 4,4-dimethyl-6,8-dinitro-3,1-benzoxazin-2-one | >600 | >600 | >600 | 258 | 255 | >600 | >1,000 |
| 4,4-dimethyl-8-methoxy-3,1-benzoxazin-2-one | 490 | >600 | 380 | 253 | 250 | 470 | >1,500 |
| 4,4-dimethyl-6-chloro-3,1-benzoxazin-2-one | 35 | 350 | 175 | 33 | 31 | 90 | 600 |
| 4,4-dimethyl-6,8-dichloro-3,1-benzoxazin-2-one | 200 | 390 | 310 | 70 | 82 | >200 | 550 |
| 4,4-dimethyl-6,8-dibromo-3,1-benzoxazin-2-one | 130 | 370 | 400 | 40 | 35 | 320 | 600 |
| 1,4,4-trimethyl-3,1-benzoxazin-2-one | 100 | 350 | 260 | 130 | 120 | 270 | 1,000 |
| 1,4,4-trimethyl-6-bromo-3,1-benzoxazin-2-one | 80 | 370 | 160 | 43 | 35 | 130 | 1,270 |
| Myanesin (1,2-dihydroxy-3-(2-methylphenoxy)-propane) | 235 | 695 | 540 | 340 | 360 | 275 | 1,350 |

From Table 1, it can be seen that the new compounds of the invention show an activity which is quite higher than that of the myanesin at similar toxicity values. These results are more clearly seen by the therapeutical index (T.I.) which represents the ratio $LD_{50}/AD_{50}$ mg./ kg. per os. These data are listed in Table 2.

TABLE 2.—THERAPEUTICAL INDEX (T.I.)

| Compound | Cardiazol | Strychnine Convulsions | Strychnine Death | Nicotine Convulsions | Nicotine Death | Electric shock convulsions |
|---|---|---|---|---|---|---|
| 4,4-dimethyl-3,1-benzoxazin-2-one | 10.0 | 4.63 | 5.86 | 7.33 | 20.95 | 6.76 |
| 4,4-dimethyl-6-bromo-3,1-benzoxazin-2-one | 13.57 | 2.6 | 2.92 | 21.59 | 23.17 | ≅13.57 |
| 4,4-dimethyl-6,8-dinitro-3,1-benzoxazin-2-one | | | | >3.87 | 3.92 | |
| 4,4-dimethyl-8-methoxy-3,1-benzoxazin-2-one | >3.06 | | >3.94 | >5.92 | >60 | >3.9 |
| 4,4-dimethyl-6-chloro-3,1-benzoxazin-2-one | 17 | 1.7 | 3.45 | 18.2 | 19.4 | 6.64 |
| 4,4-dimethyl-6,8-dichloro-3,1-benzoxazin-2-one | 2.75 | 1.41 | 1.77 | 7.84 | 6.66 | <2.75 |
| 4,4-dimethyl-6,8-dibromo-3,1-benzoxazin-2-one | 4.61 | 1.62 | 1.5 | 15 | 17.2 | 1.88 |
| 1,4,4-trimethyl-3,1-benzoxazin-2-one | 10 | 2.87 | 3.85 | 7.7 | 8.38 | 3.7 |
| 1,4,4-trimethyl-6-bromo-3,1-benzoxazin-2-one | 16 | 3.45 | 8 | 29.7 | 36.5 | 9.8 |
| Myanesin (1,2-dihydroxy-3-(2-methylphenoxy)-propane) | 5.74 | 1.94 | 2.5 | 3.97 | 3.75 | 4.9 |

The following examples illustrate the invention.

EXAMPLE 1

4,4-dimethyl-3,1-benzoxazin-2-one 7 g. of o.amino-phenyl-dimethylcarbinol (prepared as in J. Chem. Soc., 1947, p. 810) dissolved in 70 cc. of tetrahydrofuran were added to 55 cc. of an approximately 30% phosgene solution in tetrahydrofuran. After one night at room temperature, the solution was dried, taken up with 70 cc. of anhydrous pyridine and allowed to stand for 20 hours. The pyridine was eliminated in vacuo and the residue taken up with water, made alkaline with ammonia and extracted with ethyl acetate. From the residue 5.3 g. of 4,4-dimethyl-3,1-benzoxazin-2-one, melting at 115–116° C., was obtained.

EXAMPLE 2

4,4-dimethyl-6-bromo-3,1-benzoxazin-2-one

The operation was in the same manner as in Example 1 with the difference that the starting material was 2-amino - 5 - bromophenyl - dimethylcarbinol (prepared by brominating in acetic acid o.aminophenyl-dimethylcarbinol). From the residue 5.3 g. of 4,4-dimethyl-3,1-benzoxazin-2-one, melting at 203–205° C. was obtained.

EXAMPLE 3

4,4-dimethyl-6,8-dinitro-3,1-benzoxazin-2-one

The operation was in the same manner as in Example 1 with the difference that the starting material was 2-amino-3,5-dinitro-phenyl-dimethyl-carbinol (prepared by nitrating o.aminophenyl-dimethylcarbinol in nitric acid). 4,4-dimethyl-6,8-dinitro-3,1-benzoxazin-2-one, melting at 175° C., was obtained.

EXAMPLE 4

4,4-dimethyl-8-methoxy-3,1-benzoxazin-2-one

The operation was in the same manner as in Example 1 with the difference that the starting material is 2-amino-3-methoxyphenyl - dimethyl - carbinol (prepared as described in J. Chem. Soc., 1952, p. 4988). 4,4-dimethyl-8-methoxy - 3,1-benzoxazin - 2-one, melting at 96–97° C., was obtained.

EXAMPLE 5

4,4-dimethyl-6-chloro-3,1-benzoxazin-2-one

The operation was in the same manner as in Example 1 with the difference that the starting material is 2-amino-5-chloro-phenyl-dimethylcarbinol. White crystallites of 4,4-dimethyl - 6-chloro-3,1-benzoxazin-2-one, melting at 205–206° C. (from benzene) were obtained.

EXAMPLE 6

4,4-dimethyl-6,8-dichloro-3,1-benzoxazin-2-one

The operation was in the same manner as in Example 1 with the difference that the starting material was 2-amino - 3,5-dibromo-phenyldimethylcarbinol. White crystallites of 4,4-dimethyl-6,8-dibromo - 3,1-benzoxazin-2-one, melting at 180° C. (from benzene) were obtained.

EXAMPLE 7

4,4-dimethyl-6,8-dibromo-3,1-benzoxazin-2-one

The operation was in the same manner as in Example 1 with the difference that the starting material was 2-amino-3,5-dibromo-phenyldimethylcarbinol. White crystallites of 4,4-dimethyl - 6,8 - dibromo-3,1-benzoxazin-2-one, melting at 155–156° C. (from benzene) were obtained.

EXAMPLE 8

1,4,4-trimethyl-3,1-benzoxazin-2-one 5 g. of anhydrous potassium carbonate and 15 cc. of methyl iodide were added to 5 g. of 4,4-dimethyl-3,1-benzoxazin-2-one, prepared as described in Example 1 and dissolved in 60 cc. of anhydrous acetone. The mixture was refluxed under stirring for 24 hours, adding 5 cc. of methyl iodide at the 5th and 10th hour from the beginning of the reaction. The salt was filtered off and washed with anhydrous benzene. The filtrate was evaporated to dryness under vacuum, the residue was taken up with ether. 3.5 g. of white crystals of 1,4,4-trimethyl-3,1-benzoxazin - 2-one melting at 95–96° C. were obtained.

EXAMPLE 9

1,4,4-trimethyl-6-bromo-3,1-benzoxazin-2-one

The operation was carried out in the same manner as described in Example 8 using as starting material 4,4-dimethyl - 6-bromo - 3,1-benzoxazin - 2-one, prepared as described in Example 2 and methylating with methyl sulphate. White crystals of 1,4,4-trimethyl-6-bromo-3,1-benzoxazin-2-one melting at 115–116° C. (recrystallization from aqueous alcohol) were obtained.

EXAMPLE 10

1-isobutyl-4,4-dimethyl-3,1-benzoxazin-2-one

The operation was carried out in the manner as described in Example 8 using as starting material 4,4-dimethyl - 3,1-benzoxazin - 2-one and alkylating with isobutyl bromide. 1-isobutyl - 4,4-dimethyl-3,1-benzoxazin-2-one having the aspect of a limpid slightly yellow oil was obtained. This oil shows in the I.R. spectrum the following characteristic bands: 1715 cm.$^{-1}$ (v.s.), 1610 cm.$^{-1}$ (s.), 1500 cm.$^{-1}$ (s), 765–750 cm.$^{-1}$ double band (s.).

EXAMPLE 11

1-isobutyl-4,4-dimethyl-6-bromo-3,1-benzoxazin-2-one

The operation was carried out in the same manner as described in Example 8 using as starting material 4,4-dimethyl - 6-bromo-3,1-benzoxazin - 2-one and alkylating with isobutyl iodide. White crystals of 1-isobutyl - 4,4-dimethyl - 6-bromo - 3,1-benzoxazin - 2-one melting at 76–80° C. (recrystallization from petroleum benzene/ether) were obtained.

We claim:
1. A 3,1-benzoxazin-2-one of the formula

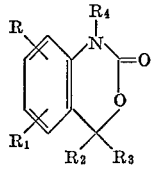

wherein R and $R_1$ are selected each from the group consisting of hydrogen, halogen, nitro, alkyl of from 1 to 4 carbon atoms and alkoxy of from 1 to 4 carbon atoms; $R_2$ and $R_3$ are each alkyl of from 1 to 4 carbon atoms; and $R_4$ is selected from the group consisting of hydrogen and alkyl of from 1 to 5 carbon atoms.

2. The compound of claim 1 which is 4,4-dimethyl-3,1-benzoxazin-2-one.
3. The compound of claim 1 which is 4,4-dimethyl-6-bromo-3,1-benzoxazin-2-one.
4. The compound of claim 1 which is 4,4-dimethyl-6,8-dinitro-3,1-benzoxazin-2-one.
5. The compound of claim 1 which is 4,4-dimethyl-8-methoxy-3,1-benzoxazin-2-one.
6. The compound of claim 1 which is 4,4-dimethyl-6-chloro-3,1-benzoxazin-2-one.
7. The compound of claim 1 which is 4,4-dimethyl-6,8-dichloro-3,1-benzoxazin-2-one.
8. The compound of claim 1 which is 4,4-dimethyl-6,8-dibromo-3,1-benzoxazin-2-one.
9. The compound of claim 1 which is 1,4,4-trimethyl-3,1-benzoxazin-2-one.
10. The compound of claim 1 which is 1,4,4-trimethyl-6-bromo-3,1-benzoxazin-2-one.
11. The compound of claim 1 which is 1-isobutyl-4,4-dimethyl-3,1-benzoxazin-2-one.
12. The compound of claim 1 which is 1-isobutyl-4,4-dimethyl-6-bromo-3,1-benzoxazin-2-one.

References Cited
UNITED STATES PATENTS

| 1,951,807 | 3/1934 | Preiswerk et al. | 260—244 |
| 2,940,971 | 6/1960 | Lott | 260—244 |
| 2,947,745 | 8/1960 | Craig | 260—244 |
| 3,047,573 | 7/1962 | Takahashi et al. | 260—244 |
| 3,280,120 | 10/1966 | Petracek | 260—244 |

OTHER REFERENCES

Kitamura: Chem. Abst., vol. 30, columns 3434–5 (1936).
Testa et al.: Chem. Abst., vol. 66, abstract 28719c (Feb. 13, 1967).
Testa et al.: Il Farmaco (Ed. Scien.), vol. 21, pp. 549–57 (August 1966).

JOHN D. RANDOLPH, Primary Examiner
N. TROUSOF, Assistant Examiner

U.S. Cl. X.R.
260—575; 424—248